United States Patent
Hamada

(10) Patent No.: US 7,592,735 B2
(45) Date of Patent: Sep. 22, 2009

(54) ALTERNATOR HAVING LUNDELL TYPE ROTOR

(75) Inventor: Hiroshi Hamada, Anjo (JP)

(73) Assignee: Denso Corporation, Kariya (JP)

(*) Notice: Subject to any disclaimer, the term of this patent is extended or adjusted under 35 U.S.C. 154(b) by 22 days.

(21) Appl. No.: 11/822,667

(22) Filed: Jul. 9, 2007

(65) Prior Publication Data
US 2008/0088199 A1    Apr. 17, 2008

(30) Foreign Application Priority Data
Oct. 16, 2006    (JP)    ............. 2006-281458

(51) Int. Cl.
H02K 1/22    (2006.01)
H02K 15/02    (2006.01)
(52) U.S. Cl. ............. 310/263; 310/156.66; 310/156.73; 310/267
(58) Field of Classification Search ............ 310/156.66, 310/51, 263, 267, 355, 156.69, 156.71, 156.73
See application file for complete search history.

(56) References Cited

U.S. PATENT DOCUMENTS

| 5,437,090 | A | 8/1995 | Sakane et al. |
| 5,903,083 | A * | 5/1999 | Mukai et al. ............. 310/263 |
| 2002/0014807 | A1 * | 2/2002 | Murata et al. ............. 310/263 |
| 2002/0053855 | A1 * | 5/2002 | Tan et al. ............. 310/263 |
| 2006/0061024 | A1 * | 3/2006 | Jung et al. ............. 267/167 |

FOREIGN PATENT DOCUMENTS

| JP | 59226645 A | * 12/1984 |
| JP | A-05-146126 | 6/1993 |
| JP | A-06-261503 | 9/1994 |
| JP | A-11-136914 | 5/1999 |

OTHER PUBLICATIONS

JP 59226645_EN.pdf (English abstarct of JP 59226645A).*
JP 59226645_EN.pdf: Sakakibara et al (JP 59226645 English abstract), Dec. 1984.*

* cited by examiner

*Primary Examiner*—Quyen Leung
*Assistant Examiner*—John K Kim
(74) *Attorney, Agent, or Firm*—Oliff & Berridge, PLC

(57) ABSTRACT

A Lundell type rotor of an alternator has a pole core disposed on an outer side of a field coil in a radial direction of the rotor, and a non-magnetic claw pole joint ring. The pole core has claw poles disposed along a circumferential direction of the rotor at predetermined intervals. Each claw pole extends along an axial direction of the rotor and is magnetized in response to an electric current supplied to the field coil. The joint ring is formed by spirally bending a long band bar in a coil shape and has turn portions disposed along the axial direction. Each turn portion of the joint ring has no seams and is attached to inner side surfaces of the claw poles in the radial direction.

6 Claims, 7 Drawing Sheets

ALTERNATOR HAVING LUNDELL TYPE ROTOR

CROSS-REFERENCE TO RELATED APPLICATION

This application is based upon and claims the benefit of priority of the prior Japanese Patent Application 2006-281458 filed on Oct. 16, 2006, so that the contents of which are incorporated herein by reference.

BACKGROUND OF THE INVENTION

1. Field of the Invention

The present invention relates generally to a Lundell type rotor of an alternator mounted on a vehicle, and more particularly to the rotor wherein a plurality of claw poles disposed along a circumferential direction of the rotor are joined to a claw pole joint ring to be fixed to one another.

2. Description of Related Art

An alternator used for a vehicle has a cylindrical stator and a columnar rotor disposed in a center space of the stator and generates an alternating current from a rotational force applied to the rotor. The rotor such as a Lundell type rotor has a rotational shaft, a rotor core rotated with the shaft, and a field coil wound on the core. The rotor core is composed of two Lundell type pole cores disposed on front and rear sides of the alternator. Each pole core has a boss portion fitted to the shaft and surrounded by the field coil, a disk portion, and a plurality of claw poles. The disk portion extends from an end of the boss portion opposite to the other pole core along a radial direction of the rotor. Each claw pole extends from a radial directional end of the disk portion along an axial direction of the rotor so as to surround the field coil with the claw poles. The claw poles of the front side pole core and the claw poles of the rear side pole core are alternately arranged along the circumferential direction. The alternator with the Lundell type rotor generally has a brush apparatus to feed a field current to the coil rotated with the rotor core. This rotor is called a brush Lundell type rotor.

Further, as another type of rotor, a Lundell type rotor with a stationary field coil has been disclosed in Published Japanese Patent First Publication No. H06-261503. In this rotor, claw poles of a rear pole core are fixed to claw poles of a front pole core, a stationary iron core portion is fixed to a rear frame of an alternator, and a stationary filed coil is wound around the stationary iron core portion. The stationary iron core portion and the field coil are disposed on the inner side of the pole cores in the radial direction. Although the pole cores with the claw poles are rotated with a rotational shaft in response to a rotational force, the filed coil remains stationary. Therefore, there is no brush apparatus in this alternator. A field magnetic flux formed by the field coil passes through the claw poles of the front pole core, a stator core, the claw poles of the rear pole core, the stationary iron core portion, and a smaller diameter portion (also called a boss portion) of the front pole core in that order, and the flux is returned to the claw poles of the front pole core.

The claw poles of the rear pole core are fixed to the claw poles of the front pole core through a claw pole joint ring. This joint ring is made of a non-magnetic metal such as 18-8 austenite stainless steel (or SUS304 prescribed by Japan Industrial Standards (JIS)). Each claw pole has an inner side surface facing the field coil along the radial direction, and the joint ring is joined to the inner side surfaces of the claw poles of the front and rear pole cores by welding so as to be placed between the field coil and the pole cores in the radial direction.

This joint ring is also used for the brush Lundell type rotor to suppress vibrations of claw poles. The joint ring for the brush Lundell type rotor is called a damper ring. A brush Lundell type rotor with a damper ring has been disclosed in each of Published Japanese Patent First Publications No. H05-146126 and No. H11-136914. In these rotors, the damper ring is formed by bending a non-magnetic metallic band plate in a ring shape and connecting both ends of the band plate with each other by welding.

More specifically, the damper ring disclosed in the Publication No. H05-146126 is joined to proximal portions of the claw poles of the front and rear pole cores. Because the extending direction of the claw poles of the front pole core is opposite to that of the claw poles of the rear pole core, the damper ring is bent toward the axial direction every claw pole pitch. In the rotor disclosed in the Publication No. H11-136914, both side ends of the damper ring in the axial direction are bent toward the inner side of the rotor along the radial direction so as to be formed in a U shape in section.

Various requirements are imposed on the joint ring and damper ring to stably fix the claw poles to one another. Particularly, in case of the Lundell type rotor with a stationary field coil, the claw poles of the rear pole core are required to have high resistance to the centrifugal force induced by the rotation of the core. Therefore, it is required to produce the joint ring at high strength and with high reliability.

When the joint ring is produced by connecting both ends of a band plate with each other by welding or the like, the joint ring inevitably has a welded portion. This welded portion is required to have the same joint strength (or tensile strength) as that of a non-welded portion of the joint ring. When the strength of the welded portion is lower than that of the non-welded portion, the strength of the joint ring is restricted to that of the welded portion. Further, to obtain the welded portion having the same tensile strength as that of the non-welded portion, it is required to precisely or uniformly weld the whole surface of one end to the whole surface of the other end of the band plate. However, it is not easy to precisely or uniformly join the ends of the band plate to each other by welding or the like. Therefore, it is difficult to ensure that the welded portion has the same strength as that of the non-welded portion.

Further, the claw poles of the alternator are vibrated at the same frequency as that of a change in the strength of the magnetic field. Therefore, the joint ring is fatigued. To prevent the fatigue failure of the joint ring, it is required to produce the joint ring having a sufficient fatigue life.

Moreover, after the joint ring is formed in a ring shape by welding, the joint ring is again welded to the claw poles. Therefore, there is a high probability of heat deterioration occurring in the joint ring. More specifically, crystal conditions of the non-magnetic metal are changed due to the thermo-mechanical processing so as to locally change magnetic characteristics of the joint ring, so that the joint ring is locally weakened in strength or the non-magnetization of the joint ring is lost.

Furthermore, the centrifugal force and/or vibration applied on a portion of the joint ring attached to each claw pole differ from those applied on another attached portion of the joint ring. Therefore, torsion is applied on the joint ring. To prevent the joint ring from being distorted, there is an idea that a sectional shape of the joint ring is not uniformly set. That is, the sectional shape of the joint ring at an attached portion is differentiated from that at another attached portion while considering the centrifugal force and/or vibration applied on the joint ring. However, the manufacturing of the rotor is complicated, and a space for the field coil is narrowed.

SUMMARY OF THE INVENTION

An object of the present invention is to provide, with due consideration to the drawbacks of the conventional rotor of an alternator, a Lundell type rotor of an alternator which is superior in a vibration proof and in resistance against a centrifugal force and is manufactured at a low cost so as to have a sufficient fatigue life.

According to an aspect of this invention, the object is achieved by the provision of a Lundell type rotor of an alternator comprising a rotor core having a plurality of claw poles and a non-magnetic claw pole joint ring attached to the claw poles. The rotor core is disposed on an outer side of a field coil in a radial direction of the rotor, and the claw poles of the rotor core are disposed along a circumferential direction of the rotor at predetermined intervals. Each of the claw poles extends along an axial direction of the rotor. The claw pole joint ring is attached to inner side surfaces of the claw poles in the radial direction. The claw pole joint ring has a plurality of turn portions substantially disposed along the axial direction so as to be formed in a coil shape, and each of the turn portions is attached to the inner side surfaces of the claw poles.

With this structure of the rotor, the claw poles of the rotor core are magnetized in response to an electric current supplied to the field coil such that a magnetic polarity is changed every claw pole. Therefore, a magnetic flux passes through each pair of claw poles adjacent to each other and a stator. When the rotor core with the magnetized claw poles is rotated on its axis, the magnetic flux passing through the stator is also rotated. Therefore, an alternating current is generated in the alternator in response to the rotated magnetic field.

During the rotation of the rotor, vibrations and a centrifugal force are applied to the claw poles. To suppress these vibrations, the claw poles are fixed to one another through the claw pole joint ring. The claw pole joint ring is, for example, made by spirally bending a long band bar in a coil shape so as to have the turn portions disposed along the axial direction. Therefore, the claw pole joint ring can have both ends set at a short length in the axial direction such that the ends of the claw pole joint ring are not attached to any other elements.

Because no heating process is applied to the ends of the claw pole joint ring, a change in magnetic characteristics of the ends can be prevented. Further, because each turn portion having no seams is attached to the claw poles, the claw pole joint ring having the plurality of turn portions can tightly be attached to the claw poles with high tensile strength. Moreover, the turn portions are independently displaced so as to reduce torsion caused in the claw pole joint ring due to the vibrations and centrifugal force.

Accordingly, the rotor with the claw pole joint ring is superior in the vibration proof and in resistance against the centrifugal force and can be manufactured at a low cost so as to have a sufficient fatigue life.

DETAILED DESCRIPTION OF THE PREFERRED EMBODIMENTS

Figure 1:
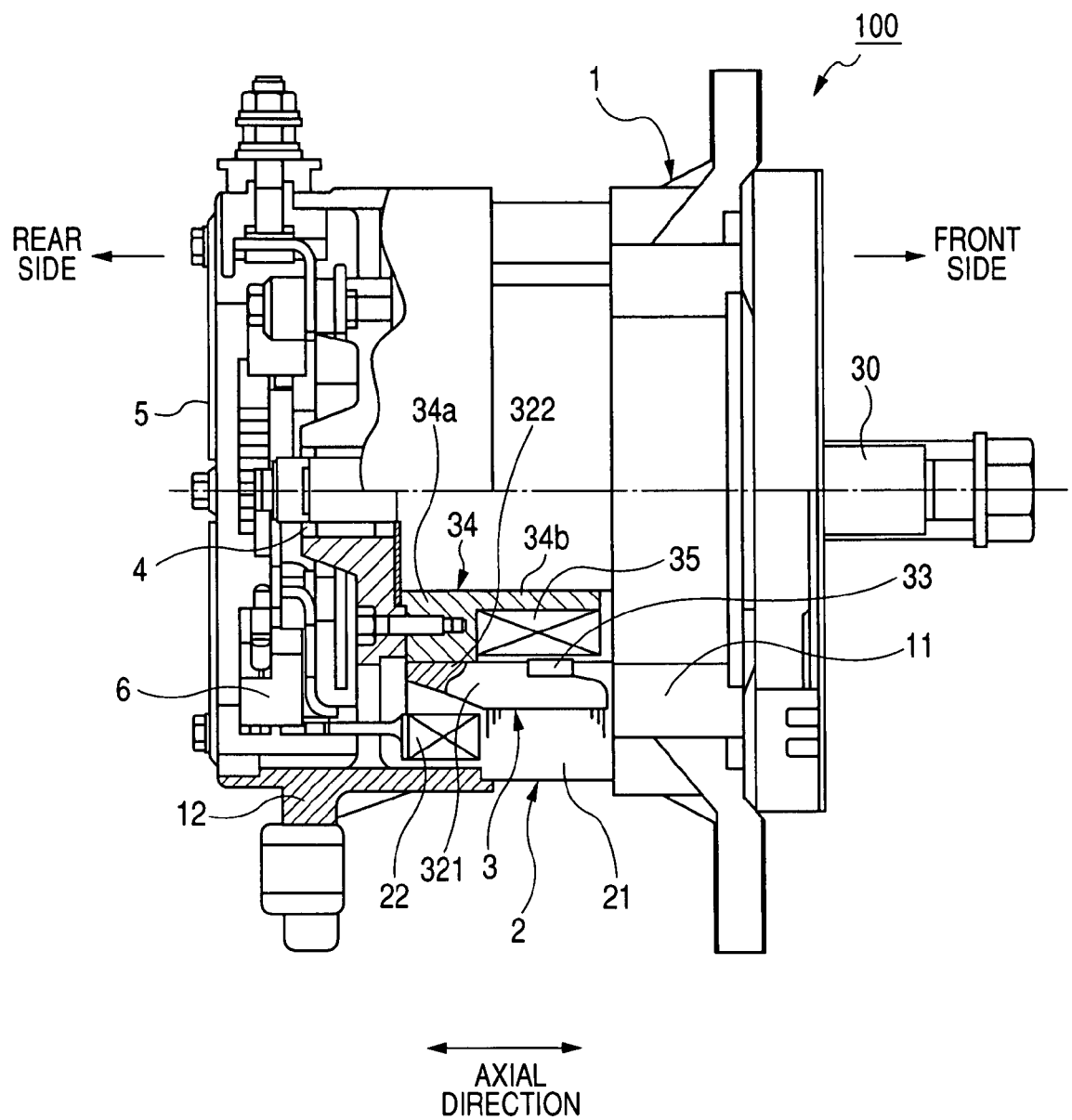
FIG. 1 is a side view, with portions broken away for clarity and partially in cross-section, of an alternator for a vehicle according to a first embodiment of the present invention.

Embodiments of the present invention will now be described with reference to the accompanying drawings, in which like reference numerals indicate like parts, members or elements throughout the specification unless otherwise indicated.

Embodiment 1

FIG. 1 is a side view, with portions broken away for clarity and partially in cross-section, of an alternator according to a first embodiment of the present invention.

As shown in FIG. 1, an alternator 100 mounted on a vehicle has a housing 1, a cylindrical stator 2 disposed in the housing 1, and a Lundell type rotor 3 formed in a columnar shape. The housing 1 has a cup-shaped front housing 11 and a cup-shaped rear housing 12, respectively, disposed on the front and rear sides of the alternator. The housings 11 and 12 hold the stator 2. The stator 2 has a stator core 21 and a stator coil 22 wound around the core 21. The rotor 3 is rotatably disposed in an inner opening of the stator 2 in a radial direction of the alternator 100. The rotor 3 has a rotational shaft 30 rotated in response to a rotational force transmitted from an engine (not shown) of the vehicle. A rear end of the shaft 30 is rotatably held by a bearing 4 of the rear housing 12, and a front end of the shaft 30 is rotatably held by a bearing of the front housing 11.

The alternator further has a cup-shaped resin cover 5 fitted to a rear end of the rear housing 12 to form an electrical apparatus chamber surrounded by the rear housing 12 and the cover 5. In this chamber, a rectifier 6 and other electrical units such as a regulator are fixed to the rear housing 12.

Figure 2:
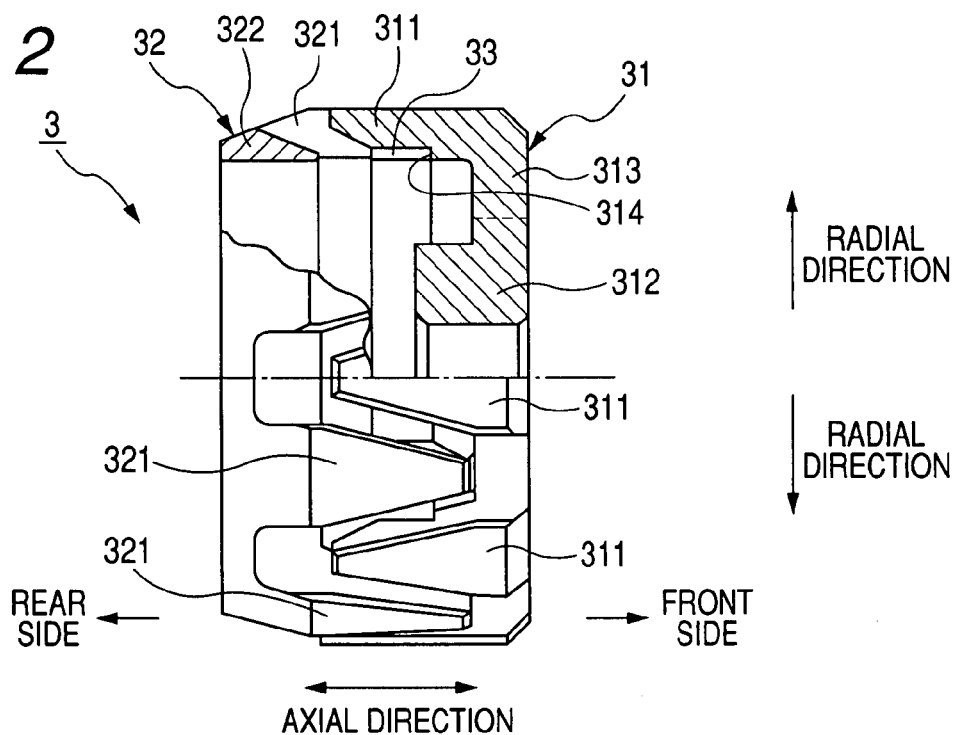
FIG. 2 is a side view, with portions broken away for clarity and partially in cross-section, of a rotor shown in FIG. 1.

FIG. 2 is a side view, with portions broken away for clarity and partially in cross-section, of the rotor 3.

As shown in FIG. 2, the rotor 3 further has a front pole core 31 disposed on the front side, a rear pole core 32 disposed on the rear side, and a claw pole joint ring 33. The pole core 31 has a boss portion 312 pressed into the shaft 30 (see FIG. 1) so as to be fixed to the shaft 30, a disk portion 313 extending from a front end of the boss portion 312 toward an outer side of the radial direction, and a large number of claw poles 311. Each claw pole 311 extends from a radial directional end of the boss portion 312 toward the rear side along the axial direction. A proximal portion of each claw pole 311 is connected with the boss portion 312, and a distal portion of each claw pole 311 is tapered. The claw poles 311 are arranged substantially at equal intervals along a circumferential direction of the rotor 3.

The rear pole core 32 has substantially the same structure as that of a normal pole core. That is, the pole core 32 has a ring portion 322 formed in a ring shape along the circumferential direction, and a large number of claw poles 321. Each claw pole 321 extends from the ring portion 322 toward the front side along the axial direction. A proximal portion of each claw pole 321 is connected with the ring portion 322, and a distal portion of each claw pole 321 is tapered. The claw poles 321 are arranged substantially at equal intervals along the circumferential direction. The claw poles 311 and claw poles 321 are alternately arranged along the circumferential direction at equal pitch.

Each of the claw poles 311 and 321 has an outer side surface on the outer side of the radial direction, and the outer side surfaces of the claw poles 311 are placed at the same position of the outer side surfaces of the claw poles 321 in the radial direction. Each of the claw poles 311 and 321 has an inner side surface on the inner side of the radial direction, and the joint ring 33 is attached to the inner side surfaces of the claw poles 311 and 321 to fix the claw poles 311 and 321 to one another.

As shown in FIG. 1, the alternator 100 further has a stationary iron core 34 formed in a cylindrical shape. The iron core 34 has a larger-diameter rear portion 34a fixed to the front end of the rear housing 12 and a smaller-diameter front portion 34b projecting from the portion 34a toward the front side along the axial direction. The alternator 100 further has a stationary field coil 35 wound around the portion 34b of the iron core 34. The iron core 34 is disposed on the inner side of the claw poles 311 and 321 and the joint ring 33 in the radial direction and is disposed on the outer side of the boss portion 312 of the pole core 31 in the radial direction. An outer circumferential surface of the portion 34a of the iron core 34 faces an inner circumferential surface of the ring portion 322 of the pole core 32 at a small distance so as to transmit a field magnetic flux between the iron core 34 and the pole core 32. An inner circumferential surface of the iron core 34 faces an outer circumferential surface of the boss portion 312 of the pole core 31 at a small distance so as to transmit the field magnetic flux between the iron core 34 and the pole core 31.

With this structure of the alternator, when a field current is supplied to the field coil 35, a magnetic field is induced around the coil 35. In response to the magnetic field, the claw poles 311 and 321 are magnetized such that a magnetic polarity of the claw poles 311 differs from that of the claw poles 321. Therefore, N magnetic poles and S magnetic poles are alternately formed along the circumferential direction. A magnetic flux of the magnetic field passes though the claw poles 311, the disk portion 313, the boss portion 312, the iron core 34, the ring portion 322, the claw poles 321, and the stator core 21 in that order and returns to the claw poles 311.

When the pole cores 31 and 32 fixed to each other through the joint ring 33 are rotated with the shaft 30, the magnetic flux passing through the stator 2 is also rotated with the claw poles 311 and 321. Therefore, an alternating current is generated in the stator coil 22. The regulator adjusts a voltage of this current by regulating the field current. The rectifier 6 rectifies this regulated current and outputs the rectified current to electric consumers and a battery of the vehicle.

Figure 3:
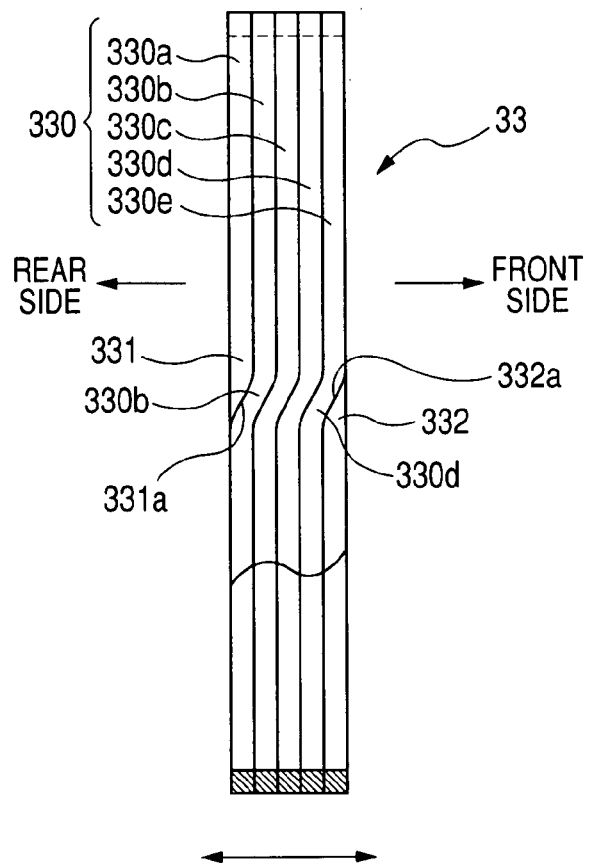
FIG. 3 is a side view, with portions broken away for clarity, of a claw pole joint ring shown in FIG. 1 and FIG. 2.

Next, a structure of the joint 33 will be described in detail with reference to FIG. 1 to FIG. 5. FIG. 3 is a side view, with portions broken away for clarity, of the joint ring 33.

As shown in FIG. 2, the joint ring 33 is made of a non-magnetic material and is formed in a cylindrical shape as a whole. The joint ring 33 is attached to the inner side surfaces of the claw poles 311 and 321 by welding or the like, so that the rear pole core 32 is fixed to the front pole core 31.

As shown in FIG. 3, the joint ring 33 is formed by spirally bending a long band bar made of a non-magnetic stainless steel and having a small thickness or a narrow width. The joint ring 33 is formed in a coil shape and has a plurality of turn portions (five turn portions in this embodiment) 330 (330a, 330b, 330c, 330d, 330e) stacked up along the axial direction. Each turn portion 330 has no seams. The number of turn portions can be arbitrarily set. The turn portions 330 of the joint ring 33 have side surfaces facing one another along the axial direction. Although the side surfaces of the turn portions 330 are in contact with one another in this embodiment, the side surfaces of the turn portions 330 maybe separated from one another. Further, the side surfaces of the turn portions 330 may be attached to one another by welding. A cross section of each turn portion on a plane perpendicular to the circumferential direction or an extending direction of the turn portion is formed substantially in a rectangular shape. Each turn portion is preferably formed substantially in a square shape in section.

Both ends 331 and 332 of the joint ring 33 are cut at a slant and sharpened so as to have slanting end surfaces 331a and 332a facing the adjacent turn portions 330b and 330d, respectively. These turn portions 330b and 330d are slightly bent or deformed at positions adjacent to the end surfaces 331 and 332 toward the axial direction so as to extend along the end surfaces 331a and 332a. The other turn portions 330 are also bent toward the axial direction so as to extend along the turn portions 330b and 330d.

Therefore, no portions of the joint ring 33 are protruded toward the axial direction, and the joint ring 33 is formed in a cylindrical shape as a whole. Further, the ends 331 and 332 of the joint ring 33 are separated from each other and are not attached to any turn portions 330 by welding or the like. That is, the ends 331 and 332 are merely in contact with side surfaces of the adjacent turn portions. However, in the present invention, although no joint strength is required between each end of the joint ring 33 and the adjacent turn portion, each end of the joint ring 33 may be attached to the adjacent turn portion by welding or the like.

Figure 4:
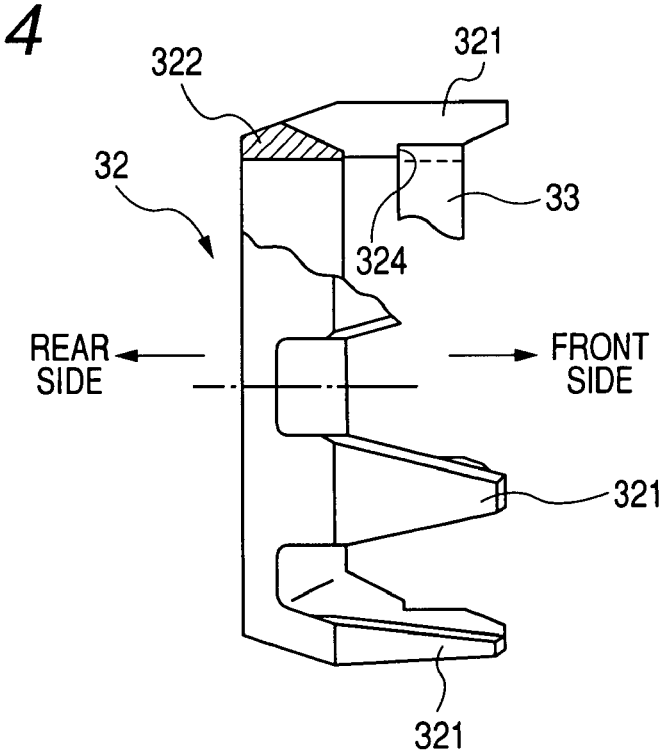
FIG. 4 is a side view, with portions broken away for clarity, of a rear pole core shown in FIG. 2.
Figure 5:
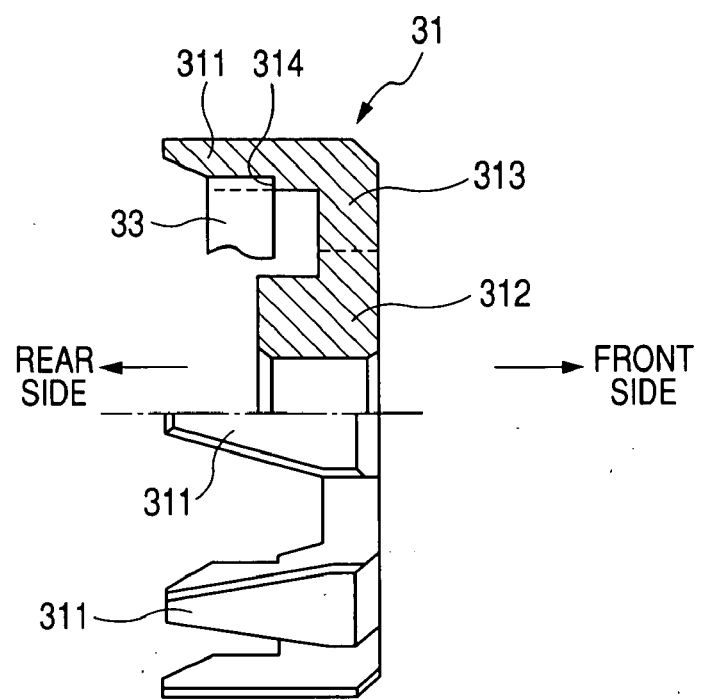
FIG. 5 is a side view, with portions broken away for clarity, of a front pole core shown in FIG. 2.

Attachment of the joint ring 33 to the claw poles 311 and 321 will be described with reference to FIG. 4 and FIG. 5. FIG. 4 is a side view, with portions broken away for clarity, of the rear pole core 32, while FIG. 5 is a side view, with portions broken away for clarity, of the front pole core 31.

As shown in FIG. 4, the inner side surface of each claw pole 321 has a difference in level along the radial direction so as to form a stair surface 324 substantially perpendicular to the axial direction, and a rear end surface of the joint ring 33 is fitted to the stair surface 324 so as to hold the joint ring 33 on the claw pole 321. In the same manner, as shown in FIG. 5, the inner side surface of each claw pole 311 has a difference in level along the radial direction so as to form a stair surface 314 substantially perpendicular to the axial direction, and a front end surface of the joint ring 33 is fitted to the stair surface 314 so as to hold the joint ring 33 on the claw pole 311. Therefore, before the joint ring 33 is welded to the claw poles 311 and 321, the joint ring 33 can easily be placed between and supported by the claw poles 311 and 321. Accordingly, the joint ring 33 can easily be attached to the claw poles 311 and 321 by welding.

Figure 6:
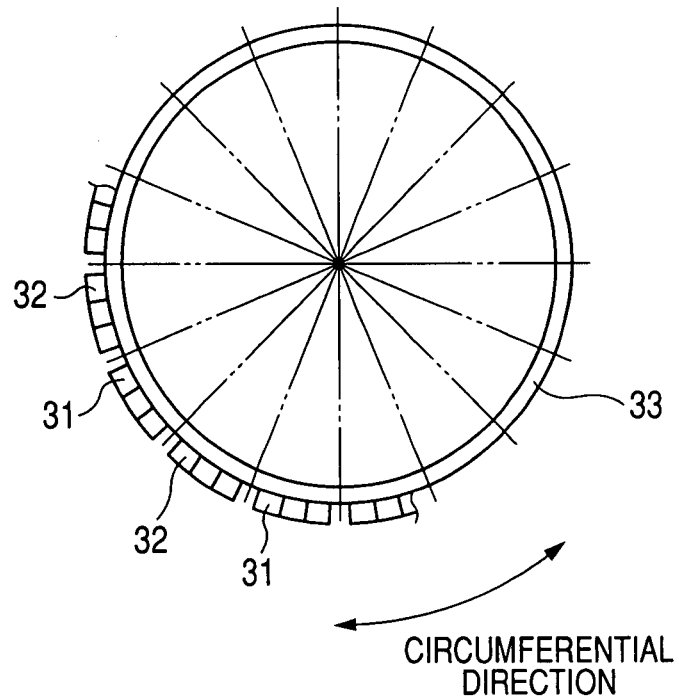
FIG. 6 is a front view of the claw pole joint ring seen along an axial direction of the rotor.
Figure 7:
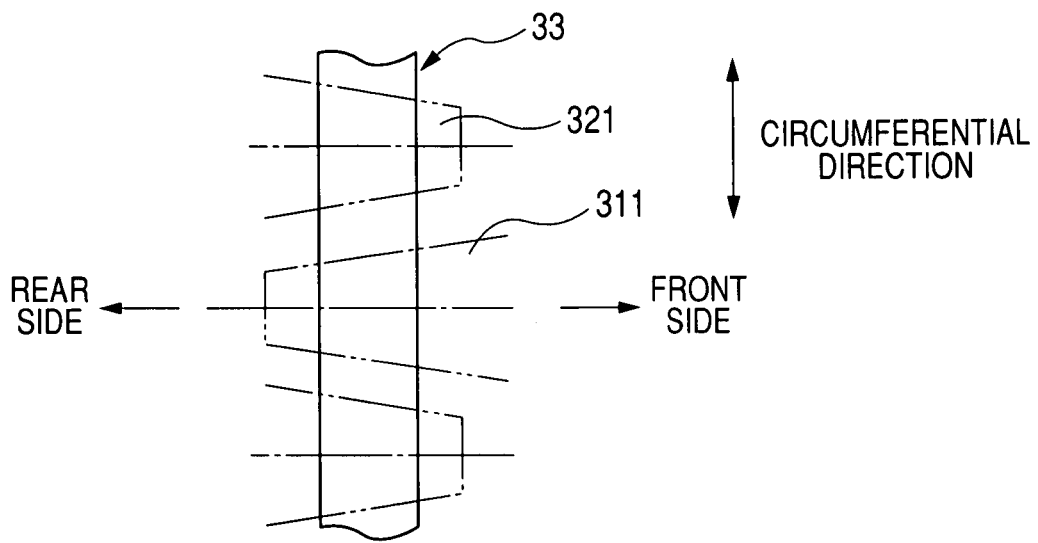
FIG. 7 is an exploded view of a portion of the claw pole joint ring seen from the inner side along a radial direction of the rotor.

FIG. 6 is a front view of the joint ring 33 seen from the front (or rear) side along the axial direction, while FIG. 7 is an exploded view of a portion of the joint ring 33 seen along the radial direction from the inner side to the outer side. In FIG. 7, the claw poles 311 and 321 are illustrated by two-dots dash lines.

As shown in FIG. 6 and FIG. 7, the inner side surface of each of the claw poles 311 and 321 is formed in an arc along the circumferential direction so as to be attached to the outer circumferential surface of the cylindrical joint ring 33. Therefore, the joint ring 33 can be tightly attached to the claw poles 311 and 321.

Accordingly, because the joint ring 33 has the plurality of turn portions 330 which are formed of a single band bar spirally bended in a coil shape, the Lundell type rotor 3 with the joint ring 33 superior in the vibration proof and in resistance against the centrifugal force can be reliably manufactured at a low cost so as to have a sufficient fatigue life.

More specifically, in a conventional rotor, because both ends of a plate having a comparatively wide width are welded to each other to form a claw pole joint ring in a ring shape, it is difficult to weld the whole end surfaces of the ends of the plate to each other with the sufficient attaching strength. Therefore, there is a high probability that the ring may be broken due to vibrations and/or a centrifugal force applied to claw poles of rotor cores. In contrast, in this embodiment, because the joint ring 33 formed in a coil shape has both ends set at a narrow width along the axial direction, it is not required to attach the ends of the joint ring 33 to each other or to the adjacent turn portions. Further, because the joint ring 33 with the plurality of turn portions 330 has a sufficient width along the axial direction, the joint ring 33 can be attached to the claw poles 311 and 321 with a sufficient joint strength. Accordingly, the joint ring 33 can reliably be attached to the claw poles 311 and 321 even when vibrations or a centrifugal force is applied to the claw poles 311 and 321 of the pole cores 31 and 32.

Further, because the ends 331 and 332 of the joint ring 33 are not welded, heat deterioration and/or a change in magnetic characteristics at the ends 331 and 332 of the joint ring 33 can be prevented.

Moreover, because the joint ring 33 has the plurality of turn portions 330 arranged along the axial direction, torsion applied on the joint ring due to vibrations and/or a centrifugal force applied to the claw poles can be suppressed. More specifically, each turn portion separated from one another in the axial direction can be displaced independent of the other turn portions 330, so that each of the turn portions 330 can be moved so as to reduce the torsion.

Furthermore, because the turn portions 330 of the joint ring 33 are in contact with one another along the axial direction, the number of turn portions 330 can be increased. Accordingly, the joint ring 33 can further reliably hold the claw poles 311 and 321 against vibrations and/or a centrifugal force applied to the claw poles.

Still further, because each turn portion of the joint ring 33 is substantially formed in a rectangular shape in section, the joint ring 33 and each claw pole can be attached to each other at a sufficient area. When the joint ring 33 is made of a band bar substantially formed in a square shape in section, the band bar can easily be bent to form the joint ring 33 in a coil shape.

Still further, the ends 331 and 332 of the joint ring 33 are cut at a slant to form slanting end surfaces 331a and 332a, and the turn portions 330 of the joint ring 33 are slightly bent along the axial direction so as to extend along the end surfaces 331a and 332a. Therefore, no portions of the joint ring 33 are protruded in the axial direction, and the joint ring 33 is formed in a cylindrical shape as a whole. Accordingly, the number of turn portions in the joint ring 33 can be maximized so as to improve a holding performance of the joint ring 33 for the claw poles against vibrations and/or a centrifugal force.

The joint ring 33 can be applied for a brush Lundell type rotor wherein a field coil receives a field current from a brush apparatus and is rotated with a rotary shaft.

Modification 1

Figure 8:
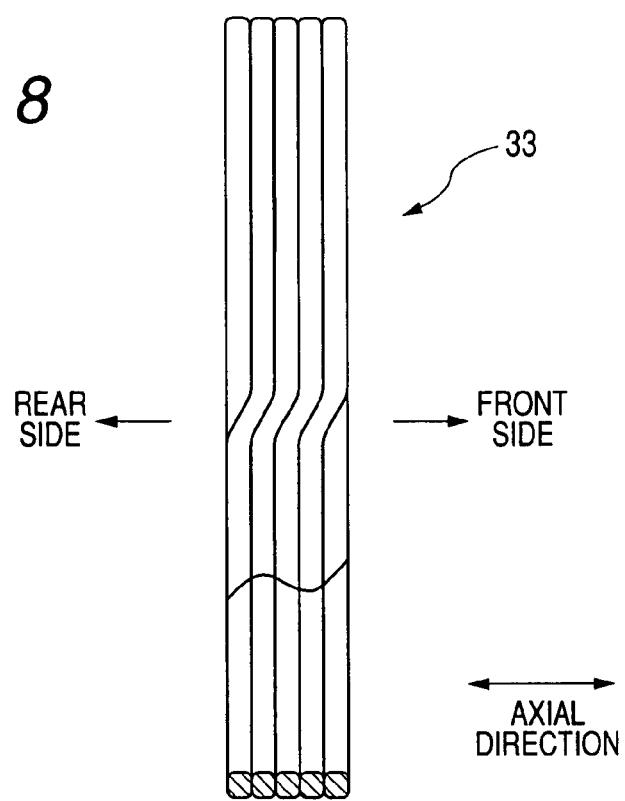
FIG. 8 is a side view, with portions broken away for clarity, of a claw pole joint ring according to a modification of the first embodiment.

FIG. 8 is a side view, with portions broken away for clarity, of the joint ring 33 according to the first modification of the first embodiment.

As shown in FIG. 8, each turn portion of the joint ring 33 may be formed in a circular shape in section. More specifically, the joint ring 33 is formed by spirally bending a long band bar made of a non-magnetic stainless steel and formed in a circular shape in section. Before the band bar is bent, deformation working such as ironing or press working is performed for the band bar. Therefore, portions of the band bar can be substantially flatten so as to be attached to the claw poles 311 and 321 in a wide attaching area.

Because the deformation working is performed for the band bar, the mechanical strength of the joint ring 33 can be heightened.

Modification 2

Figure 9:
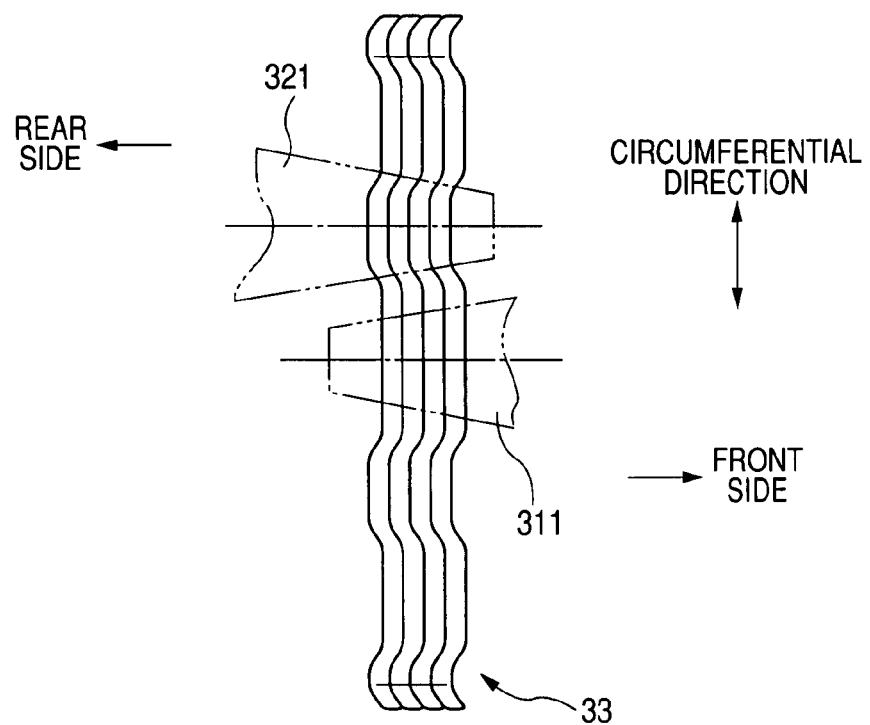
FIG. 9 is an exploded view of a portion of a claw pole joint ring seen along the radial direction according to the second modification of the first embodiment.

FIG. 9 is an exploded view of a portion of the joint ring 33 seen along the radial direction according to the second modification of the first embodiment.

As shown in FIG. 9, the turn portions 330 of the joint ring 33 may be bent toward the proximal portion of each claw pole at the same position as that of the claw pole in the circumferential direction. More specifically, the turn portions 330 are deformed toward the front side at an area facing each claw pole 311, and the turn portions 330 are deformed toward the rear side at an area facing each claw pole 321.

Accordingly, the surface of the joint ring 33 attached to each claw pole can be increased in area, so that the joint ring 33 can be attached to the claw poles 311 and 321 with the sufficient joint strength.

Other Modifications

Various types of known strength heightening processes may be performed for the band steel forming the joint ring 33 to heighten the tensile strength of the joint ring 33. Further, various types of known strength heightening processes may be performed for the joint ring 33 attached to the claw poles 311 and 321.

Further, after the joint ring 33 is made by bending the band steel in a coil shape, there is a probability that the joint ring 33 may be deformed due to the spring back caused by elasticity of the band steel. To prevent the deformation of the joint ring 33, it is preferred that the turn portions 330 of the joint ring 33 be attached to one another by the laser welding or the like.

Moreover, it is preferred that the joint ring 33 be attached to each of the claw poles 311 and 321 at an area around the center of the claw pole in the circumferential direction by the laser welding or the like. When the joint ring 33 is attached to each of the claw poles 311 and 321 by brazing, the whole portion of the joint ring 33 facing the claw pole can easily be attached to the claw pole. Accordingly, the joint strength between the joint ring 33 and the claw pole can be heightened.

Embodiment 2

Figure 10A:
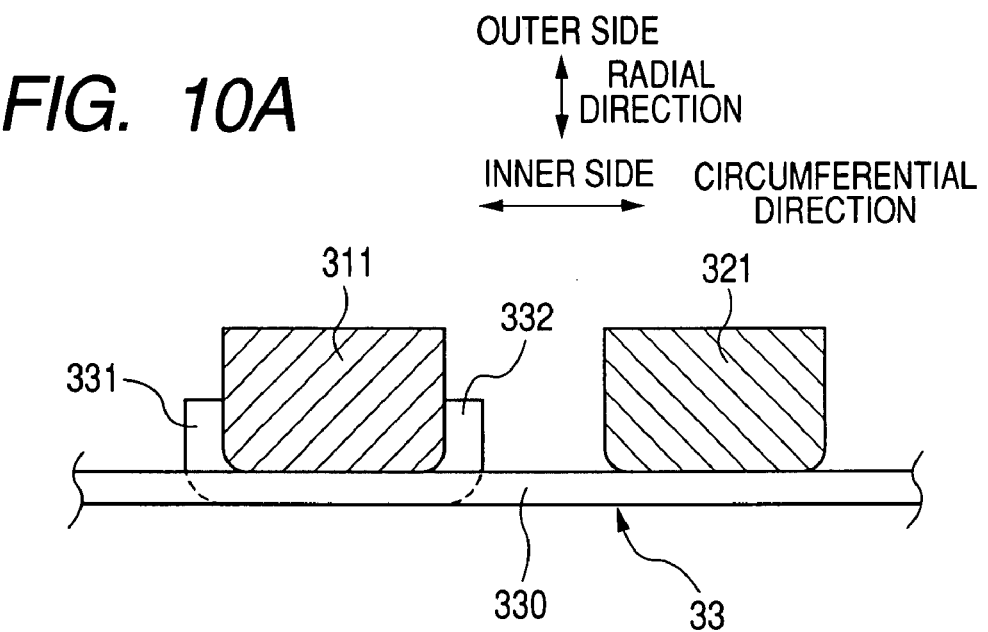
FIG. 10A is an exploded view of a portion of a claw pole joint ring seen along the axial direction and a sectional view of one pair of claw poles attached to the claw pole joint ring according to the second embodiment.
Figure 10B:
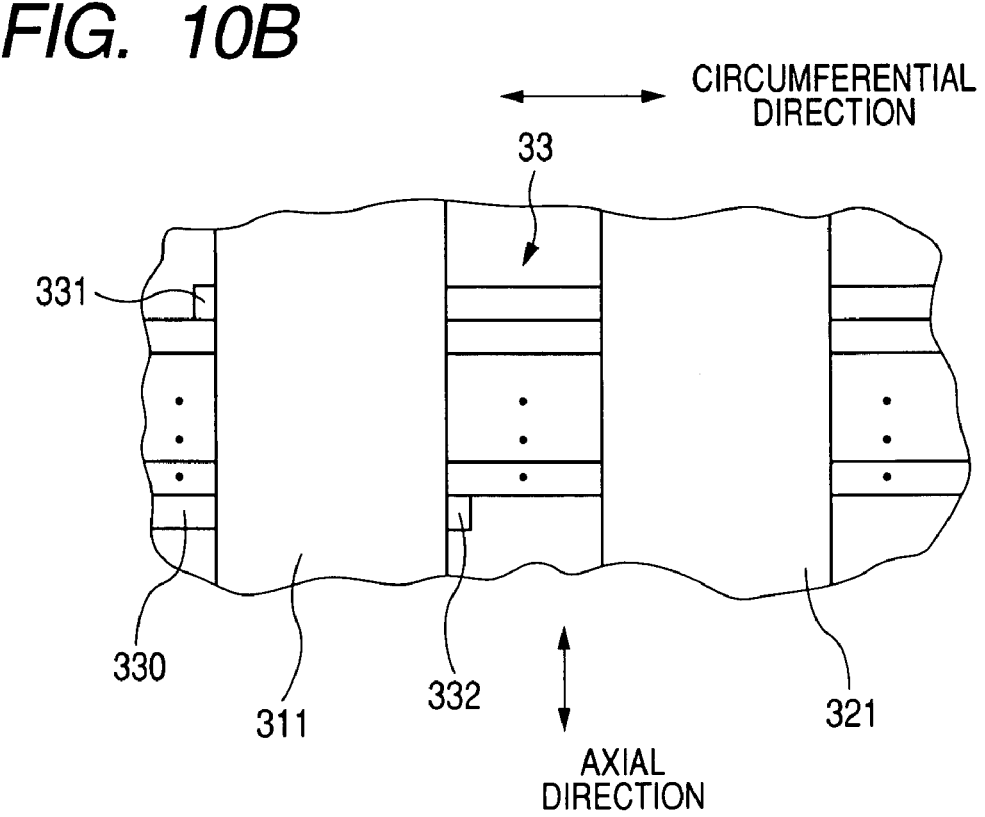
FIG. 10B is an exploded view of a portion of the paired claw poles and a portion of the claw pole joint ring seen from the outer side in the radial direction according to the second embodiment.

FIG. 10A is an exploded view of a portion of the joint ring 33 seen from the front side and a sectional view of one pair of claw poles 311 and 321 attached to the joint ring 33 according to the second embodiment, while FIG. 10B is an exploded view of a portion of the paired claw poles 311 and 321 and a portion of the joint ring 33 seen from the outer side in the radial direction according to the second embodiment. In FIG. 10A, the joint ring 33 and claw poles 311 and 321 are illustrated so as to straighten the circumferential direction.

As shown in FIG. 10A and FIG. 10B, both ends 331 and 332 of the joint ring 33 are bent toward the outer side in the radial direction while being, respectively, in contact with side walls of one claw pole 311 opposite to each other along the circumferential direction. The ends 331 and 332 of the joint ring 33 are preferably bent so as to press the joint ring 33 against the side walls of the claw pole 311 along the circumferential direction.

Accordingly, the joint strength along the circumferential direction between the joint ring 33 and one claw pole 311 can be heightened.

The ends 331 and 332 of the joint ring 33 may be bent so as to be in contact with side walls of one claw pole 321. Further, the ends 331 and 332 of the joint ring 33 may be bent toward the outer side in the radial direction while being, respectively, in contact with one side wall of one claw pole 311 or 321 and one side wall of another claw pole 311 or 321.

Embodiment 3

Figure 11A:
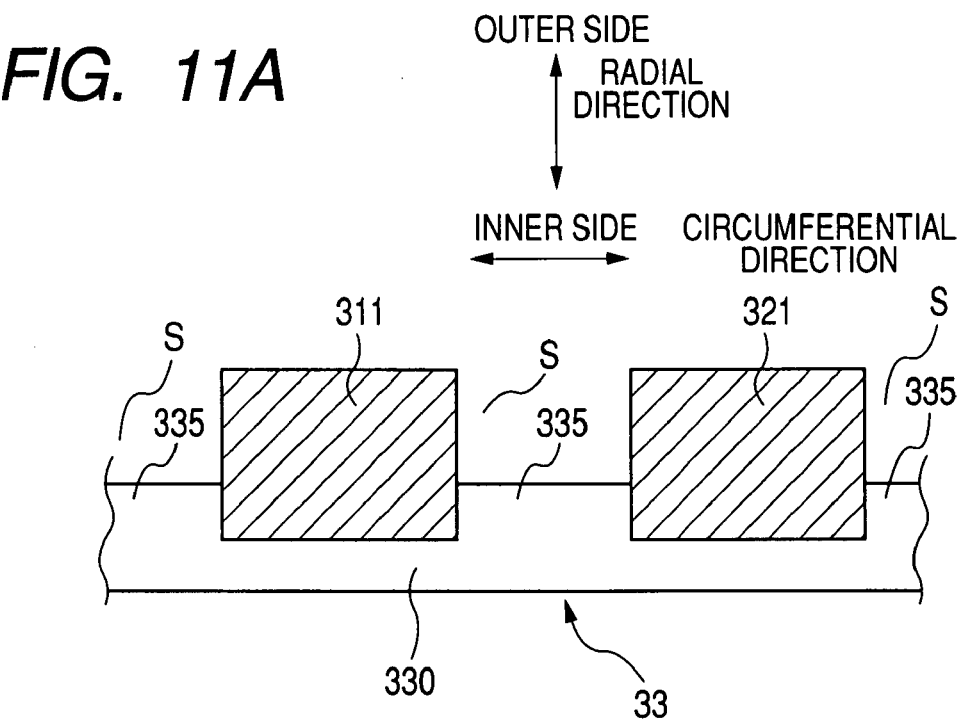
FIG. 11A is an exploded view of a portion of a claw pole joint ring seen along the axial direction and a sectional view of one pair of claw poles attached to the claw pole joint ring according to the third embodiment.
Figure 11B:
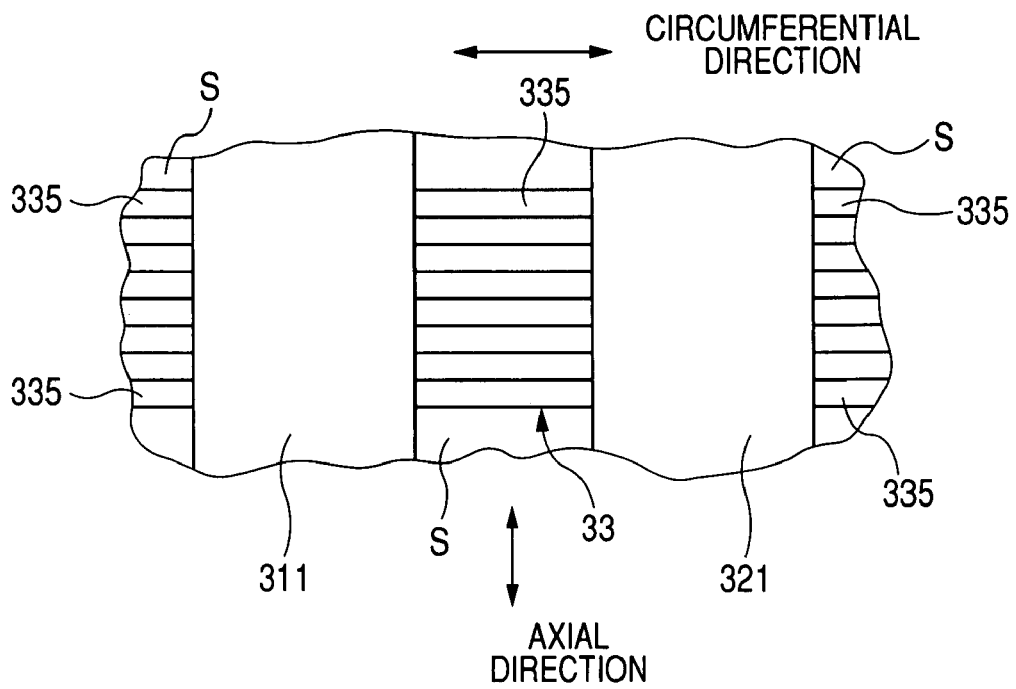
FIG. 11B is an exploded view of a portion of the paired claw poles and a portion of the claw pole joint ring seen from the outer side in the radial direction according to the third embodiment.

FIG. 11A is an exploded view of a portion of the joint ring 33 seen from the front side and a sectional view of one pair of claw poles 311 and 321 attached to the joint ring 33 according to the third embodiment, while FIG. 11B is an exploded view of a portion of the paired claw poles 311 and 321 and a portion of the joint ring 33 seen from the outer side in the radial direction according to the third embodiment. In FIG. 11A, the joint ring 33 and claw poles 311 and 321 are illustrated so as to straighten the circumferential direction.

As shown in FIG. 11A and FIG. 11B, the joint ring 33 has a plurality of projections 335 protruded toward the outer side of the radial direction at equal intervals such that each projection 335 is disposed in an open space S between one pair of claw poles 311 and 321 adjacent to each other along the circumferential direction. In other words, adjacent projections 335 in each pair face each other with one claw pole 311 or 321 between. The projections 335 are preferably shaped such that each claw pole is pressed into the joint ring 33.

Accordingly, because the projections 335 of the joint ring 33 are in contact with or are pressed against the side walls of the claw poles 311 and 321, the joint ring 33 can suppress the vibrations of the claw poles along the circumferential direction.

The projections 335 integrally formed with the joint ring 33 may be obtained by processing a long non-magnetic steel plate by a known deformation mechanical process. Alternatively, the projections 335 may be attached to a long non-magnetic plane steel plate to form the joint ring 33.

What is claimed is:

1. An alternator comprising:
a stationary iron core fixed to a housing of the alternator;
a stationary field coil, wound around the stationary iron core, which receives an electric current; and
a Lundell type rotor, comprising:
a rotational shaft, rotatable in response to a rotational force;
a pole core that is fixed to the rotational shaft on an outer side of the field coil in a radial direction of the rotor and has a plurality of claw poles disposed along a circumferential direction of the rotor at predetermined intervals, each of the claw poles extending along an axial direction of the rotor, the claw poles being magnetized in response to the electric current of the field coil such that a magnetic polarity is changed every claw pole; and
a non-magnetic claw pole joint ring which is attached to the inner side surfaces of the claw poles in the radial direction,
wherein the claw pole joint ring has a plurality of turn portions substantially disposed along the axial direction so as to be formed in a coil shape, and each of the turn portions is attached to the inner side surfaces of the claw poles, and
wherein the turn portions of the claw pole joint ring are in contact with one another in the axial direction.

2. An alternator comprising:
a stationary iron core fixed to a housing of the alternator;
a stationary field coil, wound around the stationary iron core, which receives an electric current; and
a Lundell type rotor, comprising:
a rotational shaft, rotatable in response to a rotational force;
a pole core that is fixed to the rotational shaft on an outer side of the field coil in a radial direction of the rotor and has a plurality of claw poles disposed along a circumferential direction of the rotor at predetermined intervals, each of the claw poles extending along an axial direction of the rotor, the claw poles being magnetized in response to the electric current of the field coil such that a magnetic polarity is changed every claw pole; and
a non-magnetic claw pole joint ring that is attached to the inner side surfaces of the claw poles in the radial direction,
wherein the claw pole joint ring has a plurality of turn portions substantially disposed along the axial direction so as to be formed in a coil shape, and each of the turn portions is attached to the inner side surfaces of the claw poles, and
wherein each of the turn portions of the claw pole joint ring is formed substantially in a rectangular shape in section.

3. An alternator comprising:
a stationary iron core fixed to a housing of the alternator;
a stationary field coil, wound around the stationary iron core, which receives an electric current; and
a Lundell type rotor, comprising:
a rotational shaft, rotatable in response to a rotational force;
a pole core that is fixed to the rotational shaft on an outer side of the field coil in a radial direction of the rotor and has a plurality of claw poles disposed along a circumferential direction of the rotor at predetermined intervals, each of the claw poles extending alone an axial direction of the rotor, the claw poles being magnetized in response to the electric current of the field coil such that a magnetic polarity is changed every claw pole; and
a non-magnetic claw pole joint ring that is attached to the inner side surfaces of the claw poles in the radial direction,
wherein the claw pole joint ring has a plurality of turn portions substantially disposed along the axial direction so as to be formed in a coil shape, and each of the turn portions is attached to the inner side surfaces of the claw poles, and wherein the claw pole joint ring formed in a coil shape has both ends placed on two specific turn portions at specific positions in the circumferential direction, each of the ends of the claw pole joint ring is shaped at a slant so as to have a slanting end surface being in contact with one of the turn portions, and the turn portions except for the specific turn portions, are deformed toward the axial direction at the specific positions of the ends of the claw pole joint ring so as to extend along the slanting end surfaces.

4. The alternator according to claim 1, wherein each of the turn portions of the claw pole joint ring is formed substantially in a circular shape in section.

5. The alternator according to claim 4, wherein each of the turn portions of the claw pole joint ring has a flattened surface shaped by a deformation working and attached to the corresponding claw pole.

6. The alternator according to claim 1, wherein the turn portions of the claw pole joint ring are deformed toward a proximal portion of each of the claw poles at the same position as that of the claw pole in a circumferential direction.

* * * * *